Figure 1:
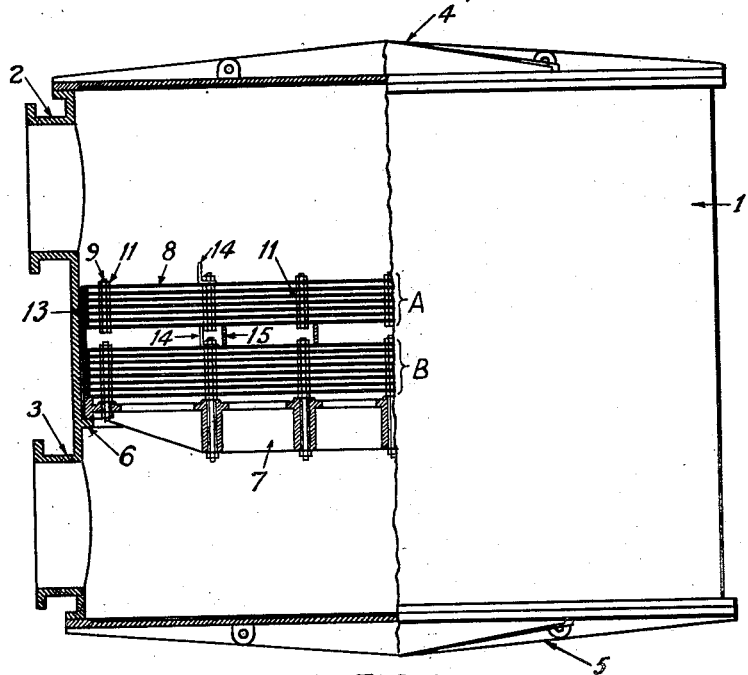
Figure 2:
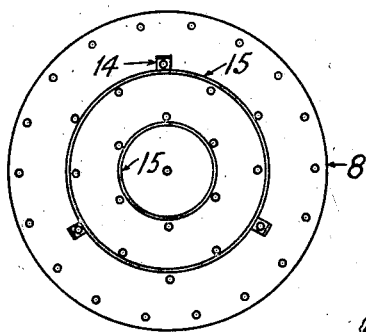
Figure 4:
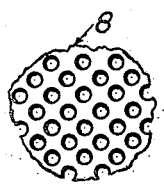
Figure 3:
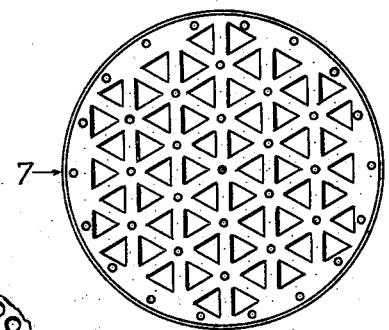

Aug. 19, 1930.  D. F. SIRDEVAN  1,773,322
CATALYTIC CONVERTER
Filed March 12, 1926

INVENTOR
DAVID F. SIRDEVAN
BY *Forbes Silsby*
ATTORNEY

Patented Aug. 19, 1930

1,773,322

UNITED STATES PATENT OFFICE

DAVID F. SIRDEVAN, OF NEW YORK, N. Y., ASSIGNOR TO GENERAL CHEMICAL COMPANY, OF NEW YORK, N. Y., A CORPORATION OF NEW YORK

CATALYTIC CONVERTER

Application filed March 12, 1926. Serial No. 94,355.

This invention relates to apparatus for holding catalytic or filtering material, and particularly to such apparatus as is used for the treatment of sulfur dioxide containing gases prior to and during the conversion of the sulfur dioxide to sulfur trioxide by catalytic oxidation. The invention further relates to apparatus for holding material for the treatment of gases generally, and is designed to be of particular value where a low resistance to the passage of gas through the apparatus is desired and where high temperature conditions are encountered.

An object of the invention is the provision of an apparatus of this type adapted to form interchangeable units, whereby ease in replacement and repair is obtained.

Another object of the invention is the provision of an apparatus in which loose or fibrous catalytic or filtering material may be held in relatively fixed position without danger of disarrangement in handling, in which a large surface area relative to depth of the material is obtained, and in which the resistance to gas flow through the apparatus approaches a minimum.

The invention further contemplates an apparatus of a type adapted to withstand high temperature conditions without warping and deterioration.

Another object of the invention is the provision of a converter unit so arranged as to completely protect the catalytic material from contamination with dust and particles of foreign matter by quickly replaceable filtering means.

An additional object of the invention is the provision of an apparatus simple and cheap to construct, easy to disassemble for purposes of repair, or replacement of the contained filtering or contact material, and in which the contained material is held without opportunity of loss, either in the gas stream passing therethrough or in handling of the containers during replacements. Moreover, by providing an apparatus in which displacement of material is reduced to a minimum, my invention further aims to reduce losses caused by improper filtration with consequent poor conversion.

With these objects in view I have constructed an apparatus adapted for this purpose, and have illustrated a preferred embodiment thereof in the accompanying drawings, in which:

Fig. I is an elevation view partly in section of a contact chamber containing my improved form of containers.

Fig. II is a plan view of a container, showing the position of spacers for supporting another container thereupon.

Fig. III is a plan view of a grid designed to form a rigid support for one or more containers.

Fig. IV is a plan view of a section of one of the perforated plates used in the construction of the containers.

For purposes of simplicity, I have, in Fig. II, neglected to show perforations in the cercular plates, as indicated in Fig. IV.

In the contact process for the manufacture of sulfuric acid it becomes necessary to pass hot sulfur dioxide containing gases in contact with a suitable catalyst to complete the oxidation of the sulfur dioxide to sulfur trioxide. It also frequently becomes necessary to filter these gases preliminary to the conversion stage to thoroughly remove all solid dust particles or other impurities carried along in the gas stream in order that the sensitive catalytic material will not become poisoned or contaminated by the objectionable impurities. The material most frequently used as the filtering medium, and as a base for the catalytic material, is various forms of asbestos. In order to be effective the asbestos must be maintained as a loose fibrous mass in order that a large surface area of contact may be provided when acting as a catalyst, and an intensive filtering action obtained, when acting as a filter. As the velocities of the gases passing through the asbestos are relatively high, it tends to pack together and loses its desired fibrous condition. Moreover, the filtering material has a tendency to form openings or voids through which the gases will pass without being subjected to the desired filtering or conversion action. In the past it has been considered extremely difficult to provide an apparatus which will function satisfactorily to maintain over long periods the filtering or contact material as a uniform bed of fibrous, fluffy material free from voids and packed masses.

The initial temperature of the sulfur dioxide gas must be in the neighborhood of 400° C. to obtain a satisfactory reaction rate in the conversion of the sulfur dioxide. As the conversion proceeds, the temperature of the gases rises considerably, as the reaction is highly exothermic, frequently approaching 550-600° C. Moreover, these temperatures, and often ones much higher, are frequently encountered in the filtering stages. In the more recently developed contact processes, as for instance in that process disclosed in the U. S. patent to Merriam, 1,384,566, the sulfur dioxide gases from the brimstone burners are passed without a cold purification treatment to the converters. It will be seen that in this process the sulfur dioxide gases to be filtered prior to the conversion stage will be at temperatures above that initially desired for conversion. At these high temperatures the known types of supports or holders sag and warp out of position, resulting in displacement of the contact or filtering medium with consequent loss of efficiency, and rendering repair and replacement of the apparatus extremely tedious. It has been found difficult to design a type of apparatus capable of withstanding the high temperature conditions encountered, without warping of the apparatus, and which at the same time was not unduly expensive to construct and which would not offer a high resistance to the passage of gases therethrough. It is to overcome these difficulties that I have devised my present form of apparatus.

In Fig. I, I have shown my preferred type of construction placed in a contact chamber 1 adapted to contain same. This contact chamber is preferably a cylindrical iron casting provided with an inlet 2 and outlet 3, above and below the filtering and contact material. The contact chamber is provided with a removable top 4 and bottom 5, in order that by removing same the containers for the filtering and contact material may be easily made accessible or lifted entirely out of the contact chamber. An annular rib 6 is provided in the chamber casting to act as a seat for the cast iron grid 7, supporting the containers for the filtering and contact material.

The containers which I have devised comprise a plurality of spaced, perforated metallic plates 8 rigidly bound together at a relatively large number of points by bolts 9 extending therethrough. The bolts 9, particularly those placed adjacent the circumference of the plates, are preferably threaded and provided with nuts 11 intermediate and on the outer sides of the plates which act not only as spacers but firmly bind the plates together into a rigid construction.

I have found it desirable to space the bolts 9, or other fastening means used, uniformly over the area of the plates to take up strains and provide a uniformly rigid structure. To further provide a rigid structure, I place a steel ring 13 intermediate each pair of plates adjacent the periphery thereof. These rings are not joined to the plates but are held in position by being clamped between same by the bolts 9 and nuts 11. These rings not only act as spacers but form a practically closed container and prevent the catalytic or filtering material held between the plates from escaping. Upon the top plate I provide a number of eyes 14 held by the bolts 9, permitting lifting the entire unit from the contact chamber.

The lowermost container in the chamber is rigidly fastened to the grid 7. In this case the bolts 9 are extended through holes in the grid casting and secured by a nut upon the end thereof. In this manner the plates are rigidly held from warping and maintain the desired parallel relation. Upon the top plate of the lower container are placed a number of steel rings 15 which act as spacers to maintain the upper container the desired distance from the lower container. A number of open rings 13 may also be placed between the two containers to support the outer edges of the upper container.

Before placing the containers in the contact chamber, the filtering or contact material is packed uniformly between the plates as they are assembled. Thus by providing a series of spaced parallel plates I am enabled to form and retain in place a number of uniform beds of filtering or contact material. I have found that the beds are maintained from displacement, and the formation of voids is prevented, by thus providing a comparatively large number of relatively thin beds of material held against both vertical and lateral displacement. It will moreover be appreciated that the opportunity for loss of material in handling the containers and placing them in position is quite small. This is of great importance, particularly with reference to the catalytic material containing large amounts of platinum. In the older constructions in which the platinum carrying asbestos is loosely placed upon trays in the converter chamber, the opportunity for loss of valuable platinum is large and great care must be exercised in placing the catalyst in the converters to prevent this loss. With my type of construction it will be seen that the containers may be packed with the catalyst outside of the converter chamber at any suitable place where precautions against loss of platinum may be more easily maintained, and the container then may be placed as a unit into the converter chamber. This not only greatly increases the ease of assembling of the converters upon installation but if of even greater importance in permitting of rapid repacking of a converter unit when it becomes necessary to renew the catalytic material. The capacity of a plant is directly proportional to the amount of sulfur trioxide formed in the contact chambers, and as a converter system must be entirely shut down while it is being repacked it will be seen that it is of great importance to lessen the time required for repairing or repacking the converters. In a small plant when it becomes necessary to repack the converters, at present it may be necessary to shut down the entire plant during this period. By lowering this period of inactivity to a minimum I am able to reduce the cost of manufacture of acid.

In my preferred construction of the converter unit I pack the upper container A with asbestos to form a filter. The lower container B is packed with catalytic material in the form of platinized asbestos. It will be seen that this construction provides a filter immediately preceding the catalyst, which filter completely protects the catalyst from contamination and yet is quickly replaceable when it becomes clogged. The advantage of this construction is obvious in that as there is no appreciable space intervening between the filter and the catalyst, the filtered gas has no opportunity to pick up additional foreign matter in its passage from the filter to the catalyst. This has been found to be a distinct improvement, resulting in increased conversions and considerably longer life of the catalytic material. The time required for replacement of a filter unit is relatively short, due to my unitary replaceable construction. I am consequently enabled to maintain the converter system at maximum efficiency with minimum operating and maintenance costs. It is of course clear that any desired number of filter units and converter units may be used in a single converter chamber.

It is to be understood that while I have described my preferred embodiment as consisting of steel plates supported by a cast iron grid, that I do not intend to limit myself to these particular materials except as defined in the claims. Moreover, although I have described my apparatus in connection with the use of asbestos as a filtering or contact material, it is to be understood that it is well adapted for use with other types of materials.

I claim:

1. An apparatus of the character described, comprising a plurality of spaced perforated plates adapted to support and retain loose catalytic material or the like, a plurality of fastening means for retaining each of said plates in a relatively fixed position with respect to the other plates and for maintaining the several plates together as a rigid structural unit and means for closing the spaces between the plates at the periphery thereof.

2. An apparatus of the character described, comprising a plurality of spaced perforated plates adapted to support and retain loose catalytic material or the like, a plurality of fastening means for retaining each of said plates in a relatively fixed position with respect to the other plates and for maintaining the several plates together as a rigid structural unit, and a ring closing the space between each pair of plates adjacent the periphery thereof.

3. An apparatus of the character described, comprising a plurality of spaced perforated plates adapted to support and retain loose catalytic material or the like, a plurality of fastening means for retaining each of said plates in a relatively fixed position with respect to the other plates and for maintaining the several plates together as a rigid structural unit, said fastening means being spaced at substantially regular intervals distributed over the entire area of the plates, and means for closing the circumferential spaces between the plates at the periphery thereof.

4. An apparatus of the character described, comprising a plurality of spaced parallel perforated plates adapted to support and retain loose catalytic material or the like, bolts extending through said plates at a plurality of uniformly spaced points, nuts threaded upon said bolts upon opposite sides of said plates, and means for closing the spaces between the plates at the periphery thereof.

5. An apparatus of the character described, comprising a plurality of spaced perforated plates adapted to support and retain loose catalytic material or the like, a plurality of fastening means for retaining each of said plates in a relatively fixed position with respect to the other plates and for maintaining the several plates together as a rigid structural unit, and a rigid grid, said grid being rigidly fastened to an outer face of said group of plates.

6. An apparatus of the character described, comprising a chamber having an inlet and an outlet, a plurality of spaced perforated plates within said chamber adapted to support and retain loose catalytic material or the like, a plurality of fastening means for retaining each of said plates in a relatively fixed position with respect to the other plates, said fastening means being spaced at substantially regular intervals distributed over the entire area of said plates, means for closing the spaces between said plates adjacent the periphery thereof, a rigid grid fastened to an outer face of said group of plates, and means for supporting said grid within said chamber intermediate the inlet and outlet thereof.

7. An apparatus of the character described, comprising a chamber having an inlet and an outlet, said chamber being provided with an inwardly extending flange upon the inner walls thereof, a rigid grid resting upon said flange, a plurality of spaced perforated plates rigidly fastened together by a plurality of bolts extending therethrough and adapted to support and retain loose catalytic material or the like, said bolts having nuts threaded thereon upon opposite sides of said plates, said bolts extending into said grid whereby said plates are rigidly fastened to said grid.

8. An apparatus for the conversion of sulfur dioxide to sulfur trioxide by the contact process, comprising a chamber having an inlet and an outlet, a bed of catalytic material in said chamber intermediate said inlet and outlet, and a unitary group of spaced rigidly joined foraminous plates having filtering material therebetween removably supported in said chamber preceding said catalytic material in the direction of gas flow.

In testimony whereof I affix my signature.

DAVID F. SIRDEVAN.